(12) United States Patent
Zhu et al.

(10) Patent No.: US 12,743,807 B2
(45) Date of Patent: Sep. 22, 2026

(54) POSE ESTIMATION METHOD AND APPARATUS, DEVICE AND MEDIUM

(71) Applicant: Beijing Zitiao Network Technology Co., Ltd., Beijing (CN)

(72) Inventors: Yongming Zhu, Beijing (CN); Yuxuan Luo, Beijing (CN); Gaojie Lin, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 270 days.

(21) Appl. No.: 18/566,494

(22) PCT Filed: May 11, 2022

(86) PCT No.: PCT/CN2022/092160

§ 371 (c)(1),
(2) Date: Dec. 1, 2023

(87) PCT Pub. No.: WO2023/005341

PCT Pub. Date: Feb. 2, 2023

(65) Prior Publication Data

US 2024/0281995 A1 Aug. 22, 2024

(30) Foreign Application Priority Data

Jul. 29, 2021 (CN) ......................... 202110867072.6

(51) Int. Cl.
*G06T 7/70* (2017.01)
*G06T 7/20* (2017.01)

(52) U.S. Cl.
CPC .................. *G06T 7/70* (2017.01); *G06T 7/20* (2013.01); *G06T 2207/10016* (2013.01); *G06T 2207/30196* (2013.01); *G06T 2207/30241* (2013.01)

(58) Field of Classification Search
CPC ... G06T 7/70; G06T 7/20; G06T 2207/10016; G06T 2207/30196; G06T 2207/30241
See application file for complete search history.

(56) References Cited

U.S. PATENT DOCUMENTS

2016/0314398 A1 10/2016 Fei et al.
2017/0132794 A1* 5/2017 Lee ........................ H04N 7/188
(Continued)

FOREIGN PATENT DOCUMENTS

CN 106296598 A 1/2017
CN 108256504 A 7/2018
(Continued)

OTHER PUBLICATIONS

International Preliminary Report on Patentability for International Application No. PCT/CN2022/106374, mailed on Feb. 8, 2024, 11 pages.

(Continued)

*Primary Examiner* — Christopher S Kelley
(74) *Attorney, Agent, or Firm* — Astute IP Law Group

(57) ABSTRACT

A pose estimation method is provided. The method includes: according to timing sequence information, acquiring frames of continuous reference images before and after a target image on timing sequence; acquiring a first pose estimation of a target object in each frame of reference image, a second pose estimation of the target object in a target image; according to a rotation smoothing algorithm, processing a rotation pose component of at least one first pose estimation and a rotation pose component of the second pose estimation, to generate a target rotation pose component; according to a translation smoothing algorithm, processing a translation pose component of each first pose estimation and a translation pose component of the second pose estimation, to generate a target translation pose component; generating a third pose estimation of the target object in the target image (Continued)

According to timing sequence information, acquiring multiple frames of continuous reference images before and after a target image in terms of timing sequence — 101

Acquiring a first pose estimation of a target object in each frame of reference image, and a second pose estimation of the target object in the target image — 102

According to a preset rotation smoothing algorithm, processing a rotation pose component of at least one first pose estimation and a rotation pose component of the second pose estimation, so as to generate a target rotation pose component — 103

According to a preset translation smoothing algorithm, processing a translation pose component of each first pose estimation and a translation pose component of the second pose estimation, so as to generate a target translation pose component — 104

Generating a third pose estimation of the target object in the target image according to the target rotation pose component and the target translation pose component — 105 according to the target rotation pose component and the target translation pose component.

18 Claims, 9 Drawing Sheets

(56) References Cited

U.S. PATENT DOCUMENTS

| | | | | |
|---|---|---|---|---|
| 2022/0319120 | A1* | 10/2022 | Ponjou Tasse | G06T 19/006 |
| 2022/0383457 | A1* | 12/2022 | Zeng | G06T 15/20 |
| 2023/0421902 | A1* | 12/2023 | Kang | G06T 5/20 |

FOREIGN PATENT DOCUMENTS

| | | |
|---|---|---|
| CN | 109788189 A | 5/2019 |
| CN | 112560796 A | 3/2021 |

OTHER PUBLICATIONS

International Search Report and Written Opinion for International Application No. PCT/CN2022/106374, mailed on Sep. 28, 2022, 8 Pages.

Written Opinion for International Application No. PCT/CN2022/092160, mailed on Jul. 21, 2022, 7 Pages.

Xun, “Lightweight Person-person Interaction Recognition Based on Skeleton Sequence,” China Master’s’ Theses Full-Text Database (Electronic Journal)—Information & amp; Technology, Tianjin Polytechnic University, CN, Feb. 15, 2020, No. 2, 23 pages.

Du et al., “Electronic Image Stabilization Algorithm for Estimating Rotation and Translation Simultaneously,” Computer Engineering and Applications, 2010, vol. 46, No. 4, pp. 233-235, with English Abstract.

International Search Report in PCT/CN2022/092160, mailed Jul. 20, 2022, 4 pages.

* cited by examiner

POSE ESTIMATION METHOD AND APPARATUS, DEVICE AND MEDIUM

CROSS-REFERENCE TO RELATED APPLICATION

The present application is a U.S. National Stage Application of PCT Application Serial No. PCT/CN2022/092160, filed May 11, 2022, which claims the priority of Chinese Patent Application 202110867072.6, filed on Jul. 29, 2021, and entitled “Pose Estimation Method and Apparatus, Device, and Medium”, the disclosures of which are incorporated herein by reference in their entireties.

FIELD

The present disclosure relates to the technical field of data processing, and in particular, to a pose estimation method and apparatus, a device and a medium.

BACKGROUND

With the development of the computer technology, the application scenarios of the pose estimation technology are increasingly wider, for example, application scenarios such as performing virtual try-on and driving the attachment of some virtual materials according to pose estimation.

However, the current pose estimation method causes certain jitter, and an application effect generated according to pose estimation is relatively poor in following performance, and has a certain floating feeling.

SUMMARY

In order to solve the above technical problems or at least partially solve the above technical problems, the present disclosure provides a pose estimation method and apparatus, a device and a medium.

In a first aspect, an embodiment of the present disclosure provides a pose estimation method, wherein the method includes:

according to timing sequence information, acquiring multiple frames of continuous reference images before and after a target image in terms of timing sequence;

acquiring a first pose estimation of a target object in each frame of reference image, and a second pose estimation of the target object in the target image;

according to a preset rotation smoothing algorithm, processing a rotation pose component of at least one first pose estimation and a rotation pose component of the second pose estimation, so as to generate a target rotation pose component;

according to a preset translation smoothing algorithm, processing a translation pose component of each first pose estimation and a translation pose component of the second pose estimation, so as to generate a target translation pose component; and generating a third pose estimation of the target object in the target image according to the target rotation pose component and the target translation pose component.

In an optional implementation, acquiring the first pose estimation of the target object in each frame of reference image, and the second pose estimation of the target object in the target image, includes:

acquiring a corresponding first transformation matrix of the target object from a preset initial position to a target position in each frame of reference image, and determining the first transformation matrix as the first pose estimation of the target object in each frame of reference image; and acquiring a second transformation matrix of the target object from the initial position to a target position in the target image, and determining the second transformation matrix as the second pose estimation of the target object in the target image. In an optional implementation, the method further includes:

calculating the at least one first transformation matrix according to a preset association algorithm which is represented by a quaternion and a rotation, so as to acquire the rotation pose component of the at least one first transformation matrix, and calculating the second transformation matrix to acquire the rotation pose component of the second transformation matrix; and respectively extracting translations of the target object on a horizontal axis, a vertical axis and a longitudinal axis for each first transformation matrix, so as to acquire the translation pose component of each first transformation matrix, and extracting the translations of the target object on the horizontal axis, the vertical axis and the longitudinal axis for the second transformation matrix, so as to acquire the translation pose component of the second transformation matrix.

In an optional implementation, according to the preset rotation smoothing algorithm, processing the rotation pose component of the at least one first pose estimation and the rotation pose component of the second pose estimation, so as to generate the target rotation pose component, includes:

acquiring the rotation pose component of the first transformation matrix of the target object in the previous frame of reference image of the target image;

acquiring the rotation pose component of the second transformation matrix of the target object in the target image; and according to a preset spherical linear interpolation algorithm, processing the rotation pose component of the first transformation matrix of the previous frame of reference image, the rotation pose component of the second transformation matrix of the target image, and a preset rotation smoothing coefficient, so as to generate the target rotation pose component.

In an optional implementation, the method further includes:

according to a preset algorithm, calculating the rotation pose component of the first transformation matrix of the previous frame of reference image and the rotation pose component of the second transformation matrix of the target image, so as to acquire a first result;

taking a maximum value between the first result and a preset first coefficient as a second result;

processing the second result according to the preset algorithm, so as to generate a third result; and taking a minimum value between the third result and a preset second coefficient as the rotation smoothing coefficient.

In an optional implementation, according to the preset translation smoothing algorithm, processing the translation pose component of each first pose estimation and the translation pose component of the second pose estimation, so as to generate the target translation pose component, includes:

acquiring the translation pose component of the first transformation matrix of the target object in each frame of reference image;

acquiring the translation pose component of the second transformation matrix of the target object in the target image;

based on the translation pose component of the first transformation matrix of each frame of reference image and the translation pose component of the second transformation matrix of the target image, generating a translation vector according to timing sequence information;

according to a least square method, processing the translation vector and a preset translation coefficient by using a linear function fitting algorithm, so as to generate a translation motion trajectory; and extracting, from the translation motion trajectory, the target translation pose component corresponding to time point information of the target image.

In an optional implementation, the method further includes:

determining the translation coefficient according to the reference image and the number of image frames of the target image.

In an optional implementation, generating the third pose estimation of the target object in the target image according to the target rotation pose component and the target translation pose component, includes:

performing point multiplication processing on the target rotation pose component and the target translation pose component, so as to generate a third transformation matrix of the target object in the target image, and determining the third transformation matrix as the third pose estimation of the target object in the target image.

In a second aspect, an embodiment of the present disclosure provides a pose estimation apparatus, wherein the apparatus includes:

a first acquisition module, configured to: according to timing sequence information, acquire multiple frames of continuous reference images before and after a target image in terms of timing sequence;

a second acquisition module, configured to acquire a first pose estimation of a target object in each frame of reference image, and a second pose estimation of the target object in the target image;

a first generation module, configured to: according to a preset rotation smoothing algorithm, process a rotation pose component of at least one first pose estimation and a rotation pose component of the second pose estimation, so as to generate a target rotation pose component;

a second generation module, configured to: according to a preset translation smoothing algorithm, process a translation pose component of each first pose estimation and a translation pose component of the second pose estimation, so as to generate a target translation pose component; and In a third aspect, the present disclosure provides a computer-readable storage medium, wherein an instruction is stored in the computer-readable storage medium, and when the instruction is running on a terminal device, the terminal device implements the above method.

In a fourth aspect, the present disclosure provides an electronic device, wherein the electronic device includes: a processor; and a memory used for storing a processor-executable instruction; and the processor is used for reading the executable instruction from the memory and executing the instruction to implement the above method.

In a fifth aspect, the present disclosure provides a computer program product, wherein the computer program product includes a computer program/instruction, and the computer program/instruction implements the above method when executed by a processor.

Compared with the prior art, the technical solutions provided in the embodiments of the present disclosure at least have the following advantages:

In the pose estimation method provided in the embodiments of the present disclosure, different smoothing strategies are used according to different properties of translation and rotation, and by means of processing the rotation pose components of the first pose estimation and the second pose estimation using the rotation smoothing algorithm, a more accurate and stable target rotation pose component can be obtained; by means of processing the translation pose components of the first pose estimation and the second pose estimation using the translation smoothing algorithm, a more accurate and stable target translation pose component can be obtained, so that the third pose estimation generated according to the target rotation pose component and the target translation pose component has good stability and following performance, the generation of a floating feeling is avoided, and the user experience and satisfaction are thus improved.

BRIEF DESCRIPTION OF THE DRAWINGS

The above and other features, advantages and aspects of various embodiments of the present disclosure will become more apparent in combination with the drawings and with reference to specific implementations. Throughout the drawings, the same or similar reference signs indicate the same or similar elements. It should be understood that the drawings are schematic and that original members and elements are not necessarily drawn to scale.

DETAILED DESCRIPTION OF EMBODIMENTS

Figure 1:
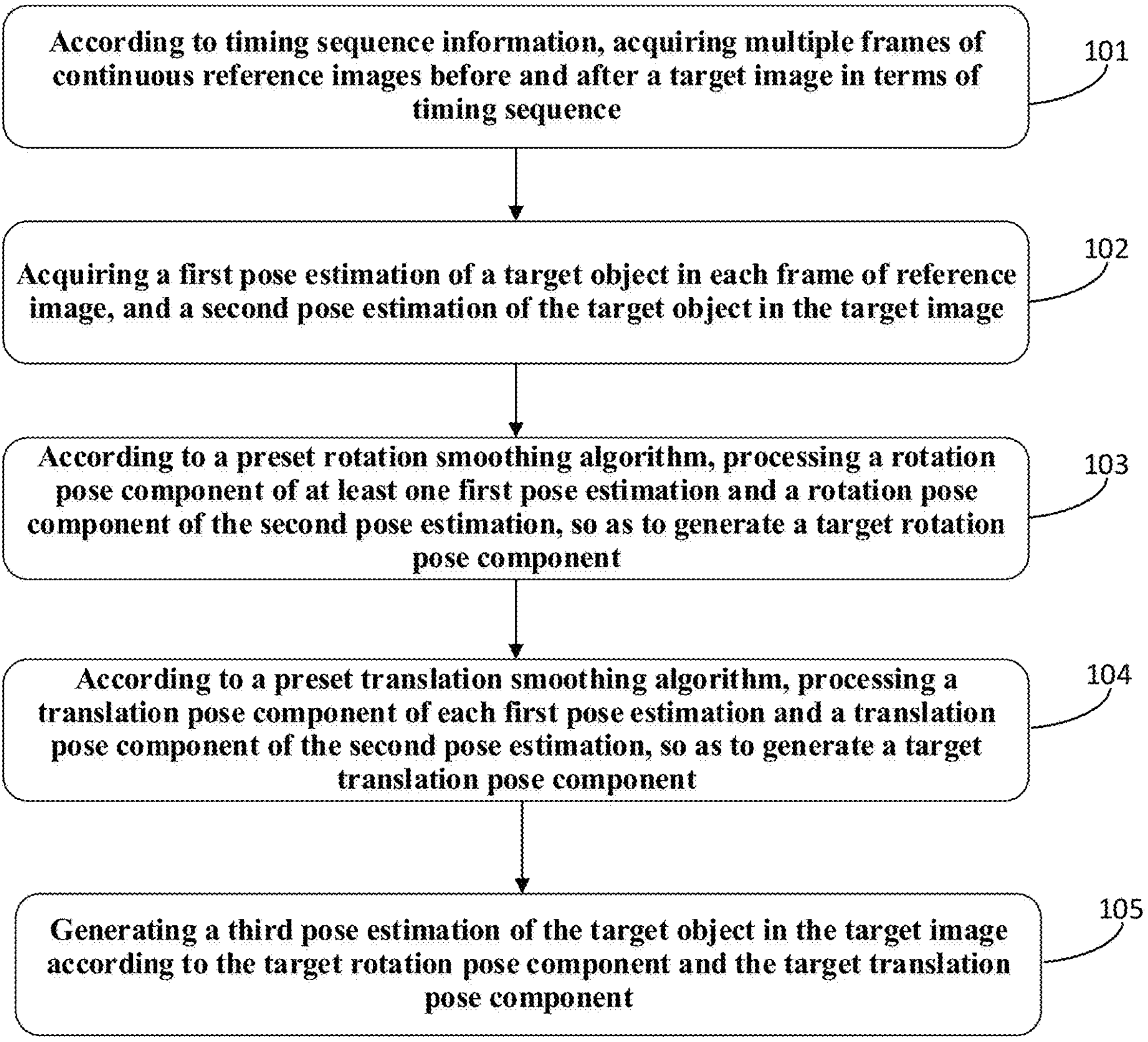
FIG. 1 is a schematic flowchart of a pose estimation method provided in an embodiment of the present disclosure.

Hereinafter, embodiments of the present disclosure will be described in more detail with reference to the drawings.

While certain embodiments of the present disclosure have been illustrated in the drawings, it is to be understood that the present disclosure may be embodied in various forms and should not be construed as being limited to the embodiments set forth herein; rather, these embodiments are provided to help understand the present disclosure more thoroughly and completely. It should be understood that the drawings and embodiments of the present disclosure are for exemplary purposes only and are not intended to limit the protection scope of the present disclosure.

It should be understood that various steps recited in method embodiments of the present disclosure may be performed in a different sequence and/or in parallel. In addition, the method embodiments may include additional steps and/or omit performing the steps shown. The scope of the present disclosure is not limited in this respect.

As used herein, the terms "include" and variations thereof are open-ended terms, i.e., "include, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that definitions such as "first" and "second" mentioned in the present disclosure are only intended to distinguish between different apparatuses, modules or units, and are not intended to limit the sequence or interdependence of the functions performed by these apparatuses, modules or units.

It should be noted that the modifiers such as "one" and "more" mentioned in the present disclosure are intended to be illustrative and not restrictive, and those skilled in the art should understand that they should be interpreted as "one or more" unless the context clearly indicates otherwise.

The names of messages or information interacted between a plurality of apparatuses in the embodiments of the present disclosure are for illustrative purposes only and are not intended to limit the scope of such messages or information.

In order to solve the above problems, the embodiments of the present disclosure provides a pose estimation method, and the method is described below in conjunction with specific embodiments.

FIG. 1 is a schematic flowchart of a pose estimation method provided in an embodiment of the present disclosure, and the method may be executed by a pose estimation apparatus, wherein the apparatus may be implemented by using software and/or hardware, and may be generally integrated in an electronic device. As shown in FIG. 1, the method includes:

Step 101: according to timing sequence information, acquiring multiple frames of continuous reference images before and after a target image in terms of timing sequence.

Step 102: acquiring a first pose estimation of a target object in each frame of reference image, and a second pose estimation of the target object in the target image.

A video of the target object is photographed, and after pose estimation is performed on the target object in the photographed video, a related application is performed according to the estimated pose. For example, when the target object is a human foot, virtual try-on of a shoe is performed according to the pose estimation of the foot; and when the target object is a human palm, various special effect effects and the like are added according to the pose estimation of the hand. Therefore, in order to reduce the jitter of pose estimation and to improve the stability and the following performance of an application effect, it is necessary to perform pose estimation on the target object more accurately. It should be noted that the target object may be selected according to an application scenario, which is not limited in the present embodiment.

The video is composed of multiple frames of continuous images, and the timing sequence information may be used for recording a sequential relationship among the multiple frames of images. It can be understood that, it is generally necessary to respectively perform pose estimation on the target object in each frame of image in the video, and the target image may be an image on which pose estimation is performed at present. In order to perform pose estimation on the target object in the target image, firstly, multiple frames of continuous reference images before and after the target image in terms of timing sequence are acquired by means of the timing sequence information, wherein the number of frames of the reference images may be set according to the application scenario, which is not limited in the present embodiment. For example, if the 100th frame of the video is the target image, respective first and latter N frames of the video may be used as reference images (N is a positive integer), for example, when N=2, the 98th, the 99th, the 101st and the 102nd frames of the video are used as reference images; and the first K frames and the latter J frames of the video may also be used as reference images (K and J are both positive integers; K≠J), for example, when K=2, and J=1, the 98th, the 99th and the 101st frames of the video are used as reference images.

Then, pose estimation is respectively performed on the target object in each reference image, so as to acquire the first pose estimation of the target object in each frame of reference image. At the same time, the pose estimation is performed on the target object in the target image, so as to acquire the second pose estimation of the target object in the target image. It should be noted that there are a plurality of methods for acquiring the first pose estimation and the second pose estimation, which may be selected according to the application scenario, and which is not limited in the present embodiment. For example, the first pose estimation and the second pose estimation are acquired by means of a neural network model.

Step 103: according to a preset rotation smoothing algorithm, processing a rotation pose component of at least one first pose estimation and a rotation pose component of the second pose estimation, so as to generate a target rotation pose component.

Step 104: according to a preset translation smoothing algorithm, processing a translation pose component of each first pose estimation and a translation pose component of the second pose estimation, so as to generate a target translation pose component.

It can be understood that, the pose estimation represents a change process of the target object moving from one initial position to the current position, therefore component processing can be performed on the pose estimation from the dimension of motion direction, so as to acquire the translation pose components and the rotation pose components. Specifically, after the component processing is performed on the first pose estimation, the rotation pose component and the translation pose component corresponding to the first pose estimation are obtained; and after the component processing is performed on the second pose estimation, the rotation pose component and the translation pose component corresponding to the second pose estimation are obtained. It should be noted that, according to the specific expression form of the pose estimation, corresponding algorithms are selected to perform the component processing on the pose estimation, so as to acquire the translation pose components and the rotation pose components, which is not limited in the present embodiment.

According to multiple times of test observation and reasoning analysis, it is found that the difference between the translation pose component and the rotation pose component of the first pose estimation of the target object is also relatively large, so that the translation pose component and the rotation pose component of the first pose estimation also need to be processed by using corresponding different algorithms. Similarly, the difference between the translation pose component and the rotation pose component of the second pose estimation of the target object is also relatively large, that is, the noise performance of the translation pose component is different from that of the rotation pose component, therefore the translation pose component and the rotation pose component of the second pose estimation can be processed by using corresponding different algorithms. Specifically, smoothing processing may be performed on the rotation pose components of the first pose estimation and the second pose estimation by using the preset rotation smoothing algorithm, and smoothing processing may be performed on the translation pose components of the first pose estimation and the second pose estimation by using the preset translation smoothing algorithm.

It should be noted that, the rotation smoothing algorithm includes, but is not limited to, any one of a linear interpolation algorithm and a spherical linear interpolation algorithm; and the rotation component of the first pose estimation and the rotation component of the second pose estimation are processed according to the rotation smoothing algorithm, so as to obtain the target rotation pose component, wherein the target rotation pose component is a component, in a rotation direction, of the pose estimation of the target object in the target image. It should be emphasized that, in some application scenarios, the number of reference images and the positions of the reference images in a timing sequence are determined according to the rotation smoothing algorithm, for example, the spherical linear interpolation algorithm generally processes the target image and the previous frame reference image thereof, therefore when the spherical linear interpolation algorithm is selected as the rotation smoothing algorithm, in the case that the 100th frame of the video is the target image, the rotation pose component of the pose estimation in the 99th frame of reference image is selected to perform the smoothing processing.

In addition, it should be noted that the translation smoothing algorithm includes, but is not limited to, any one of a least square method and a nonlinear least squares method, the translation component of the first pose estimation and the translation component of the second pose estimation are processed according to the translation smoothing algorithm, so as to obtain the target translation pose component, wherein the target translation pose component is a component, in a translation direction, of the pose estimation of the target object in the target image. It should be emphasized that, in some application scenarios, the number of reference images and the positions of the reference images in the timing sequence are determined according to the translation smoothing algorithm, for example, the least square algorithm generally processes the target image, and the first L frames and latter N frames of reference images (L and N are integers, and the relative number of L and N is not limited), therefore when the least square algorithm is selected, L=N=2 may be selected, in the case that the 100th frame of the video is the target image, the translation pose components of the pose estimations in the 98th, 99th, 101st and 102nd frames of reference image are selected to perform the smoothing processing.

Step 105: generating a third pose estimation of the target object in the target image according to the target rotation pose component and the target translation pose component.

As described above, the target rotation pose component is the component, in the rotation direction, of the pose estimation of the target object in the target image, and the target translation pose component is the component, in the translation direction, of the pose estimation of the target object in the target image, therefore the third pose estimation of the target object in the target image can be generated according to the target rotation pose component and the target translation pose component. It should be noted that the corresponding algorithm may be selected according to the specific expression forms of the target rotation pose component and the target translation pose component to perform synthesis processing, so as to generate the third pose estimation.

In the pose estimation method provided in the embodiment of the present disclosure, firstly, multiple frames of continuous reference images before and after the target image in terms of timing sequence are acquired according to the timing sequence information, the first pose estimation of the target object in each frame of reference image, and the second pose estimation of the target object in the target image are acquired. Then, by means of processing the rotation pose components of the first pose estimation and the second pose estimation using the rotation smoothing algorithm, a more accurate and stable target rotation pose component can be obtained; and by means of processing the translation pose components of the first pose estimation and the second pose estimation using the translation smoothing algorithm, a more accurate and stable target translation pose component can be obtained. Therefore, the third pose estimation is generated according to the target rotation pose component and the target translation pose component. In this way, the final pose estimation, which is generated by respectively performing smoothing processing on the rotation components and the translation components of multi-frame pose estimations related to the timing sequence by using corresponding smoothing algorithms, has good stability and following performance, the generation of a floating feeling is avoided, and the user experience and satisfaction are thus improved.

Figure 2:
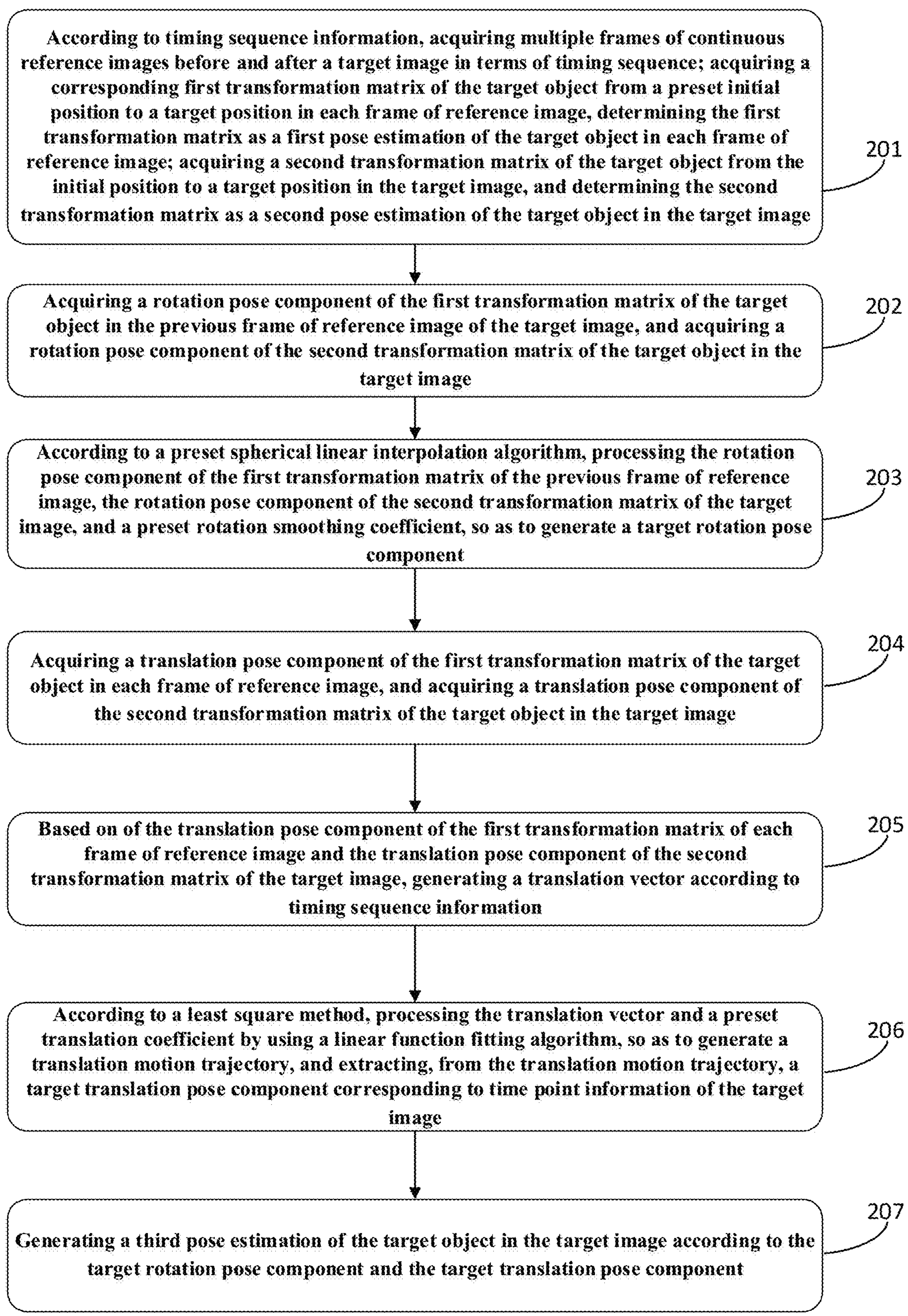
FIG. 2 is a schematic flowchart of another pose estimation method provided in an embodiment of the present disclosure.

FIG. 2 is a schematic flowchart of another pose estimation method provided in an embodiment of the present disclosure. Based on the above embodiment, as shown in FIG. 2, specific steps include:

Step 201: according to timing sequence information, acquiring multiple frames of continuous reference images before and after a target image in terms of timing sequence; acquiring a corresponding first transformation matrix of the target object from a preset initial position to a target position in each frame of reference image, and determining the first transformation matrix as a first pose estimation of the target object in each frame of reference image; and acquiring a second transformation matrix of the target object from the initial position to a target position in the target image, and determining the second transformation matrix as a second pose estimation of the target object in the target image.

The reference images are multiple frames of continuous reference images before and after the target image, the reference images may be selected according to the application scenario, which is not limited in the present embodiment, for example, in the case that the 100th frame of the video is the target image, the reference images may be the 98th, 99th, 101st and 102nd frames of the video.

In each frame of image, the position of the target object changes, a transformation matrix may be used for representing the transformation of the target object from one position to another. Therefore, in some embodiments of the present disclosure, the initial position may be preset, and the initial position is set according to the application scenario, which is not limited in the present embodiment, for example, the initial position is the position of the target object in the previous frame of image of the first frame of reference image in the timing sequence. For each frame of reference image, the first transformation matrix is used for representing the transformation of the target object from the initial position to the target position where the target object in the current reference image is located; and in the target image to be subjected to pose estimation, the second transformation matrix is used for representing the transformation of the target object from the initial position to the target position in the target image. The initial positions of the first transformation matrix and the second transformation matrix are the same, thereby ensuring that the algorithm results between the images are consistent. It should be noted that, in some application scenarios, the transformation matrix is obtained by splicing a translation matrix representing translation behind a rotation matrix representing rotation, wherein the rotation matrix is a 3×3 matrix, and the translation matrix is a 3×1 matrix, so that the rotation matrix and the translation matrix are spliced to obtain a 3×4 transformation matrix. Therefore, in the present embodiment, both the first transformation matrix and the second transformation matrix may be represented by using a 3×4 matrix.

In an optional implementation, it is still taken as an example that the 100th frame is the target image, and the 98th, 99th, 101st and 102nd frames are reference images, the target object is a human foot, the preset initial position is the position of the foot in the 97th frame of image, then the first transformation matrix of the target object from the initial position to the target positions in the 98th, 99th, 101st and 102nd frames of reference images, and the second transformation matrix of the target object from the initial position to the target position in the 100th frame of target image are obtained. Then, the first transformation matrix and the second transformation matrix may be calculated to obtain corresponding translation pose components and rotation pose components represented by a quaternion. It should be noted that, the specific numerical value of the transformation matrix of the target image in each frame of image is not completely the same, and in order to illustrate how to split the transformation matrix into the rotation pose component and the translation pose component, a 3×4 transformation matrix M is taken as an example for illustration below.

Taking the transformation matrix M as an example, the process of acquiring the rotation pose component and the translation pose component according to the transformation matrix is illustrated, wherein the transformation matrix M is represented as:

$$M = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix}$$

Translations of the target object on a horizontal axis, a vertical axis and a longitudinal axis are respectively extracted for each first transformation matrix, so as to acquire the translation pose component of each first transformation matrix, and the translations of the target object on the horizontal axis, the vertical axis and the longitudinal axis are extracted for the second transformation matrix, so as to acquire the translation pose component of the second transformation matrix, the first transformation matrix or the second transformation matrix is represented by the transformation matrix M, in the transformation matrix M, $[a_{14}; a_{24}; a_{34}]$ represents translation, and then the value of the translation pose component V is:

$$V = [a_{14} \ \ a_{24} \ \ a_{34}]$$

Compared with the rotation matrix, the quaternion may solve the deadlock problem of a universal joint, therefore in order to convert the rotation matrix into the quaternion, at least one first transformation matrix is calculated according to a preset association algorithm, which is represented by a quaternion and a rotation matrix, so as to acquire the rotation pose component of the at least one first transformation matrix, and the second transformation matrix is calculated to acquire the rotation pose component of the second transformation matrix, the first transformation matrix or the second transformation matrix is represented by the transformation matrix M, in the transformation matrix M, $[a_{11}a_{12}a_{13}; a_{21}a_{22}a_{23}; a_{31}a_{32}a_{33}]$ represents the rotation matrix, and the value of the rotation pose component Q acquired according to the preset association algorithm, which is represented by the quaternion and the rotation matrix is:

$$Q = [w, x, y, z]$$

The value of w in the rotation pose component Q is:

$$W = \frac{\sqrt{tr(M_{:3,:3}) + 1}}{2}$$

wherein, tr( ) represents calculating the trace of the matrix, and $M_{3,3}$ represents taking a matrix composed of the first three rows and the first three columns of the transformation matrix M.

The value of x in the rotation pose component Q is:

$$x = \frac{a_{32} - a_{23}}{4w};$$

the value of y' in the rotation pose component Q is;

$$y = \frac{a_{13} - a_{31}}{4w};$$

and the value of z in the rotation pose component Q is:

$$z = \frac{a_{21} - a_{12}}{4w}.$$

It should be noted that, the transformation matrix M may represent the first transformation matrix corresponding to each frame of reference image and the second transformation matrix corresponding to the target image, and only specific values in the matrices are different; and the process of splitting the rotation pose components and the translation pose components of the first transformation matrix and the second transformation matrix is the same as that of the transformation matrix M, and only the specific values in the matrices are different, thus details are not repeated in the present embodiment again. Therefore, components of the first transformation matrix can be processed into a corresponding rotation pose component and a corresponding translation pose component according to the above implementation; and components of the second transformation matrix can be processed into a corresponding rotation pose component and a corresponding translation pose component according to the above implementation.

Step 202: acquiring a rotation pose component of the first transformation matrix of the target object in the previous frame of reference image of the target image, and acquiring a rotation pose component of the second transformation matrix of the target object in the target image Step 203: according to a preset spherical linear interpolation algorithm, processing the rotation pose component of the first transformation matrix of the previous frame of reference image, the rotation pose component of the second transformation matrix of the target image, and a preset rotation smoothing coefficient, so as to generate a target rotation pose component.

Since the motion error of the rotation pose component is smaller relative to that of the translation pose component, only the rotation pose component of the first transformation matrix of the previous frame of reference image adjacent to the target image may be selected, and then the rotation pose component of the first transformation matrix of the previous frame of reference image, the rotation pose component of the second transformation matrix of the target image and the preset rotation smoothing coefficient are processed according to the preset spherical linear interpolation algorithm, so as to generate the target rotation pose component. It is still taken as an example that the 100th frame is the target image, and the 98th, 99th, 101st and 102nd frames are reference images, and with regard to the smoothing processing of the rotation pose component, only the rotation pose component of the transformation matrix of the target object in the 99th frame and the rotation pose component of the transformation matrix of the target object in the 100th frame are selected to participate in the smoothing processing of the rotation pose.

The specific smoothing processing process of the rotation pose components is described as follows: a smooth interpolation operation is performed on the two rotation pose components by using the spherical linear interpolation algorithm. By means of processing the rotation pose components using the spherical linear interpolation algorithm, it can be ensured that the interpolation is linear, a relatively stable target rotation pose component is obtained, and an angle can be smoothed proportionally according to the weight. In addition, since the quaternion of which the modulus length is not 1 cannot represent a rotational motion, a spherical linear difference algorithm can ensure that the processed quaternion has a modulus length of 1, so that the target rotation pose component obtained by processing can still represent the rotational motion, thus ensuring the stability and accuracy of the third pose estimation, so that the visual effect of a special effect of the pose estimation obtained by using the method is relatively real.

In the present embodiment, the spherical interpolation algorithm is expressed as slerp( ), and the rotation pose component $Q_{t-1}$ of the first transformation matrix $M_1$ of the previous frame of reference image, the rotation pose component $Q_t$ of the second transformation matrix $M_2$ of the target image and the preset rotation smoothing coefficient λ are processed by using the spherical interpolation algorithm slerp( ), so as to generate the target rotation pose component Q', that is:

$$Q' = slerp(Q_{t-1}, Q_t, \lambda)$$

Similar to the calculation process in step 201, in the above formula:

The value of $Q_{t-1}$ is: $Q_{t-1}=[w_{t-1}, x_{t-1}, y_{t-1}, z_{t-1}]$;

the value of $Q_t$ is: $Q_t=[w_t, x_t, y_t, z_t]$;

for example, in the case that the 100th frame of the video is the target image: the value of the target rotation pose component Q' is: $Q'=slerp(Q_{99}, Q_{100}, \lambda)$;

the value of $Q_{99}$ is: $Q_{99}=[w_{99}, x_{99}, y_{99}, z_{99}]$;

the value of $Q_{100}$ is: $Q_{100}=[w_{100}, x_{100}, y_{100}, z_{100}]$.

The preset rotation smoothing coefficient λ may be set as a fixed value according to the application scenario, and may also be obtained by calculating the rotation pose components of the first transformation matrix $M_1$ and the second transformation matrix $M_2$, and the method for calculating the rotation smoothing coefficient λ includes the following steps:

step 1: according to a preset algorithm, calculating the rotation pose component of the first transformation matrix $M_1$ of the previous frame of reference image and the rotation pose component of the second transformation matrix $M_2$ of the target image, so as to acquire a first result.

The preset algorithm may be used for calculating the rotation pose component of the first transformation matrix $M_1$ of the reference image and the rotation pose component of the second transformation matrix $M_2$ of the target image, so as to generate a first result $R_1$, wherein the preset algorithm may be selected according to the application scenario, which is not limited in the present embodiment, for example:

the value of $R_1$ is: $R_1=(w_t w_{t-1}-x_t x_{t-1}-y_t y_{t-1}-z_t z_{t-1}-0.9)$.

For example, in the case that the 100th frame of the video is the target image:

the value of $R_1$ is: $R_1=(w_{100}w_{99}-x_{100}x_{99}-y_{100}y_{99}-z_{100}z_{99}-0.9)$.

Step 2: taking a maximum value between the first result and a preset first coefficient as a second result.

max{ } may be used for representing an operation of taking the maximum value, and the first coefficient may be set according to the application scenario, which is not limited in the present embodiment, for example: 0.

If the first coefficient is 0, the value of the second result $R_2$ is: $R_2=\max\{R_1, 0\}$.

Step 3: processing the second result according to the preset algorithm, so as to generate a third result.

It can be understood that the second result is processed by using the preset algorithm, so as to generate the third result. The preset algorithm may be selected according to the application scenario, which is not limited in the present embodiment, for example: the value of the third result $R_3$ is: $R_3=(R2\times 10)^{72}$.

Step 4: taking a minimum value between the third result and a preset second coefficient as the rotation smoothing coefficient.

The rotation smoothing coefficient λ is the minimum value between $R_2$ and the second coefficient. The second coefficient may be set according to a specific application situation, and if the second coefficient is 0.9, the value of the rotation smoothing coefficient λ is: $\lambda=\min\{0.9, R_2\}$.

min{ } may be used for representing an operation of taking the minimum value, and the second coefficient may be set according to the application scenario, which is not limited in the present embodiment.

Step 204: acquiring a translation pose component of the first transformation matrix of the target object in each frame of reference image, and acquiring a translation pose component of the second transformation matrix of the target object in the target image.

Step 205: based on the translation pose component of the first transformation matrix of each frame of reference image and the translation pose component of the second transformation matrix of the target image, generating a translation vector according to timing sequence information.

For example, in the case that the 100th frame of the video is the target image, the reference images may be the 98th, 99th, 101st and 102nd frames of the video, the translation pose components of the transformation matrix corresponding to the 98th to the 102nd frames are respectively: $V_{98}$、$V_{99}$、$V_{100}$、$V_{101}$、$V_{102}$, then the translation pose component corresponding to each frame of image may be sorted according to the timing sequence information, so as to form a translation vector Y, wherein the value of the translation vector Y is:

$$y=[V_{98}, V_{99}, V_{100}, V_{101}, V_{102}]^T$$

Step 206: according to a least square method, processing the translation vector and a preset translation coefficient by using a linear function fitting algorithm, so as to generate a translation motion trajectory, and extracting, from the translation motion trajectory, a target translation pose component corresponding to time point information of the target image.

The preset translation coefficient may be related to the total number of frames of the reference images and the target image. In some embodiments of the present application, the translation motion trajectory may be set as a d-power polynomial function; by means of observation on the multiple frames in the video, the translation vector Y and the preset translation coefficient X are processed according to the least square method and by using the linear function fitting algorithm; the translation motion trajectory is generated by using the linear function fitting algorithm, thereby minimizing the error of the translation pose component obtained by means of the translation motion trajectory; and since the translation pose component of the reference image adjacent to the target image is used, the problem of lag of the target translation pose component can also be solved, thereby ensuring that the third pose estimation has good stability and following performance.

In the data processed by the linear function fitting algorithm, the preset translation coefficient X may be adjusted according to the application scenario, which is not limited in the present embodiment. For example: the preset translation coefficient X may be related to the coefficient d of the polynomial function, and the total number l of frames of the reference images and the target image, and then the preset translation coefficient X may be expressed as:

$$X=\begin{bmatrix}1 & 0 & 0 & \cdots & 0\\ 1 & 1 & 1 & \cdots & 1\\ \vdots & \vdots & \vdots & \cdots & \vdots\\ 1 & l-1 & (l-1)^2 & \cdots & (l-1)^d\end{bmatrix}$$

According to the translation vector Y and the preset translation coefficient X, a translation motion trajectory F may be obtained, and the expression of the translation motion trajectory F is $F=(X^TX)^{-1}X^TY$.

It can be understood that a point on the translation motion trajectory may represent the translation pose component corresponding to the time point. Therefore, the corresponding target translation pose component V' may be extracted from the translation motion trajectory according to the time point information of the target image.

Step 207: generating a third pose estimation of the target object in the target image according to the target rotation pose component and the target translation pose component.

In summary, the transformation matrix M may be decomposed into the rotation pose component and the translation pose component, and similarly, a third transformation matrix may be generated according to the target rotation pose component and the target translation pose component, and the third transformation matrix is the third pose estimation of the target object in the target image, that is, a synthesized pose estimation after rotation smoothing and translation smoothing.

Specifically, point multiplication processing may be performed on the target rotation pose component Q' and the target translation pose component V', the target rotation pose component and the target translation pose component may be merged by means of point multiplication processing, so as to generate the third transformation matrix of the target object in the target image, and the third transformation matrix is the third pose estimation.

In the pose estimation method provided in the embodiment of the present disclosure, different smoothing algorithms are respectively used to perform the smoothing processing on the rotation pose components and the translation pose components, and through test observation, it is found that the noise performances of the rotation pose and the translation pose of the target object are different, therefore a better smoothing effect can be obtained by using different smoothing processing methods for the rotation pose and the translation pose.

Figure 3A:
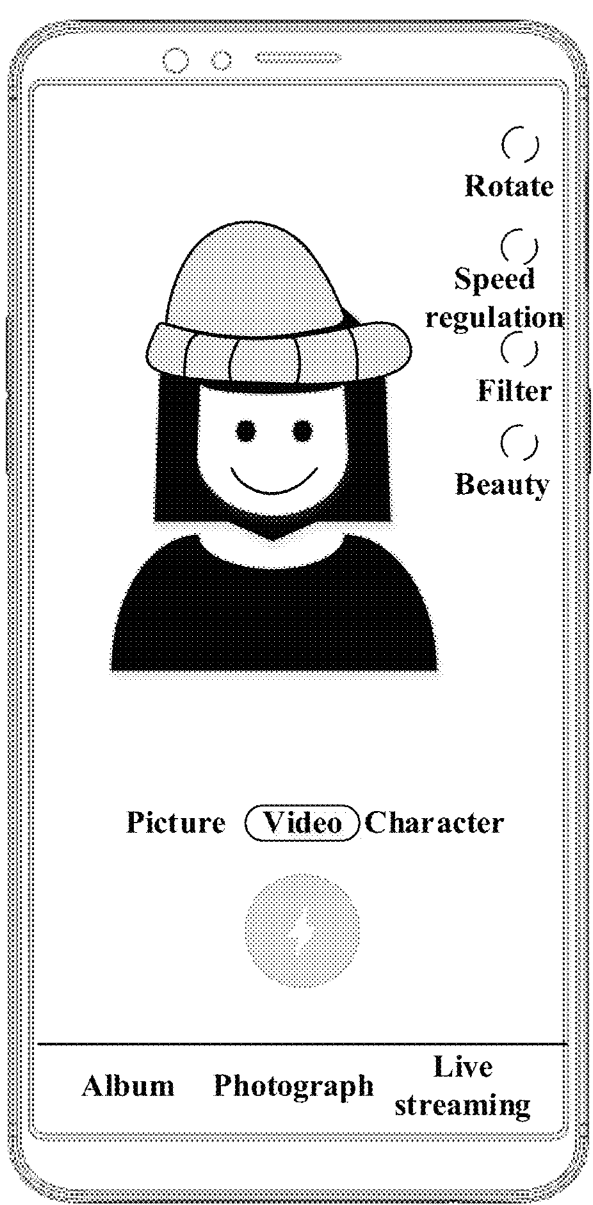
FIG. 3*a* is a schematic diagram of a previous frame of a target image of a pose estimation method provided in an embodiment of the present disclosure.
Figure 3B:
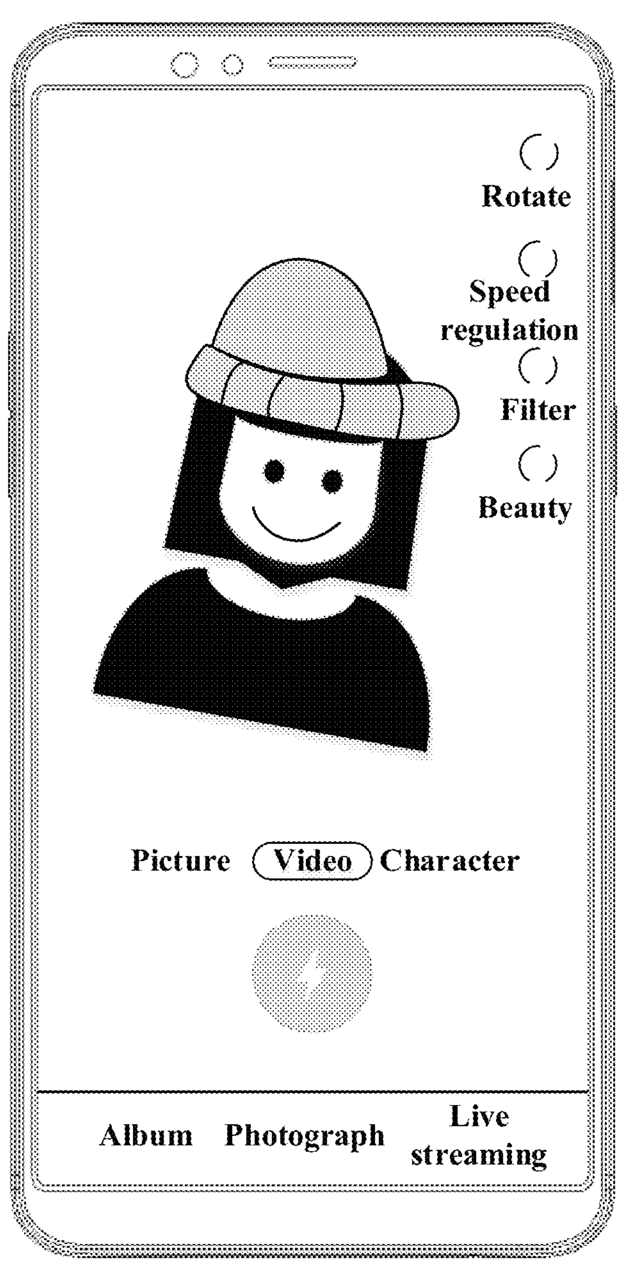
FIG. 3*b* is a schematic diagram of a target image of a pose estimation method provided in an embodiment of the present disclosure.
Figure 3C:
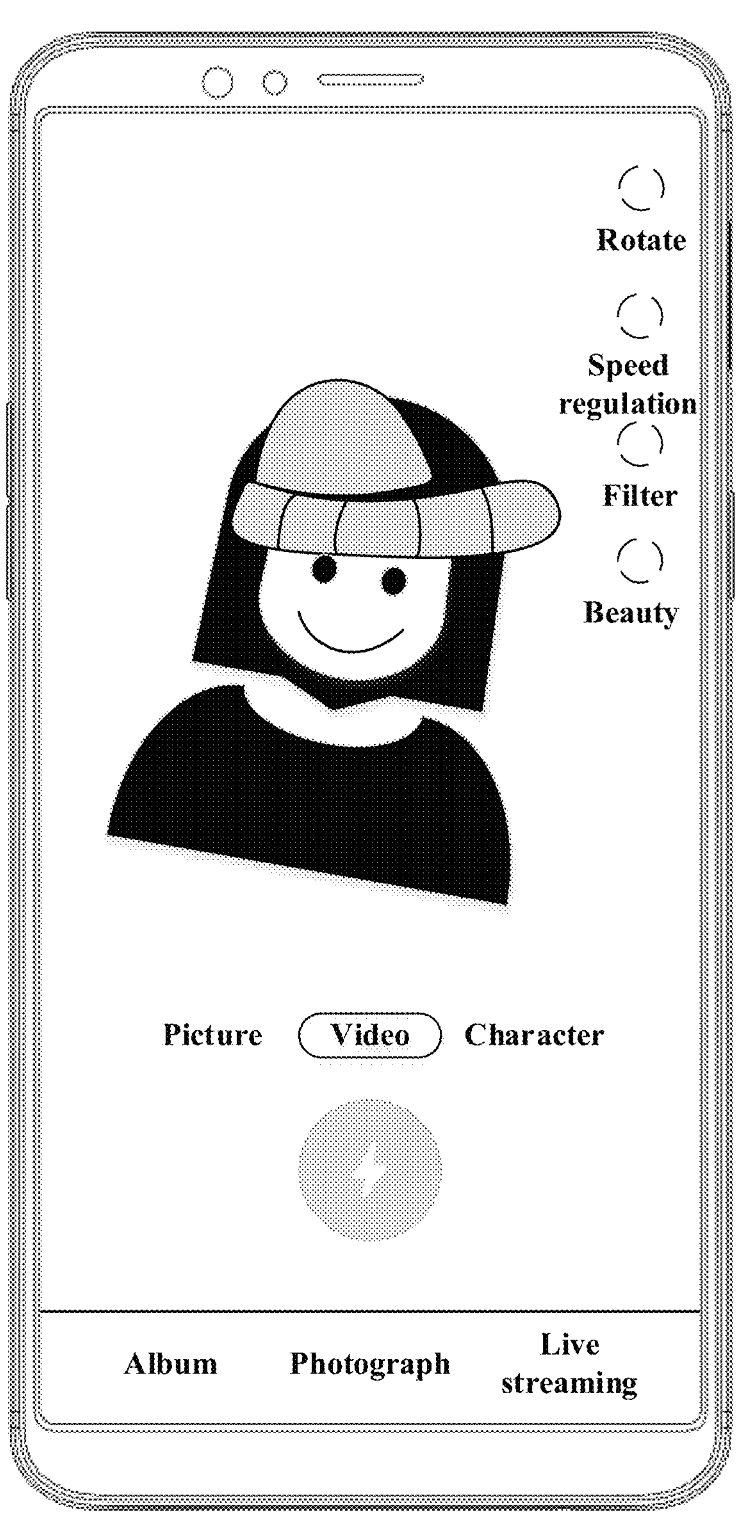
FIG. 3*c* is a schematic diagram of a target image of another pose estimation method provided in an embodiment of the present disclosure.
Figure 4A:
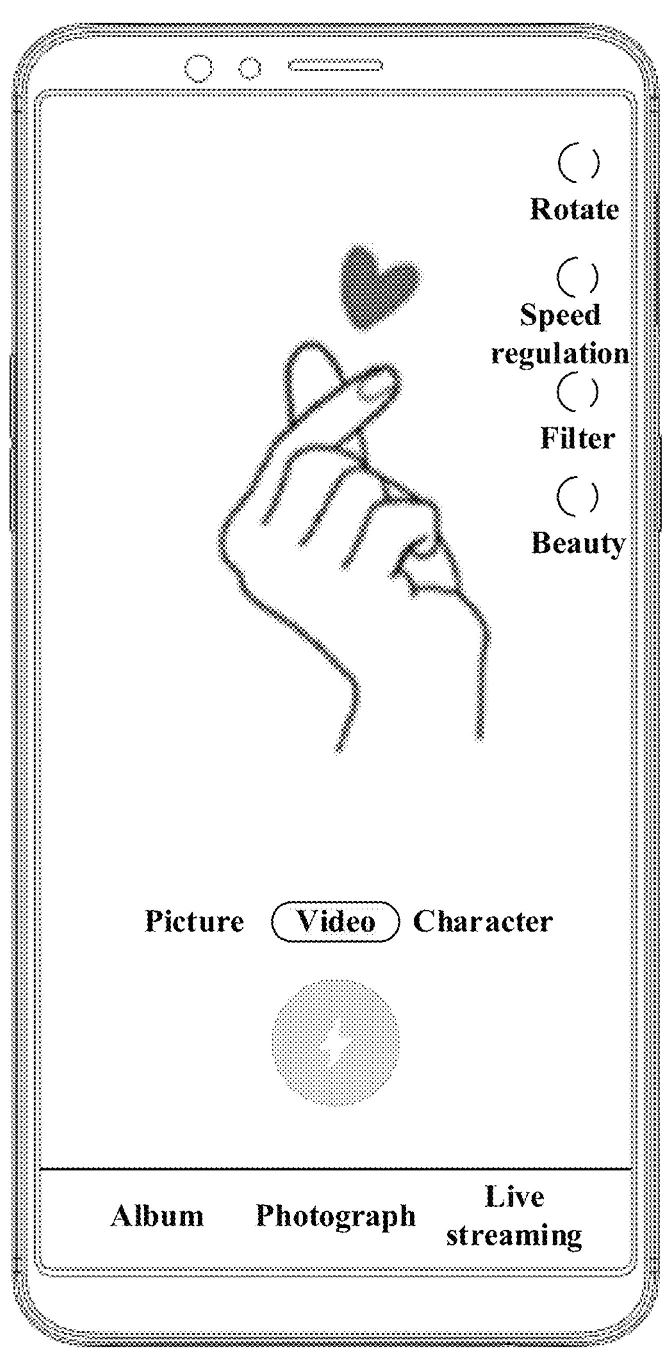
FIG. 4*a* is a schematic diagram of a previous frame of a target image of another pose estimation method provided in an embodiment of the present disclosure.
Figure 4B:
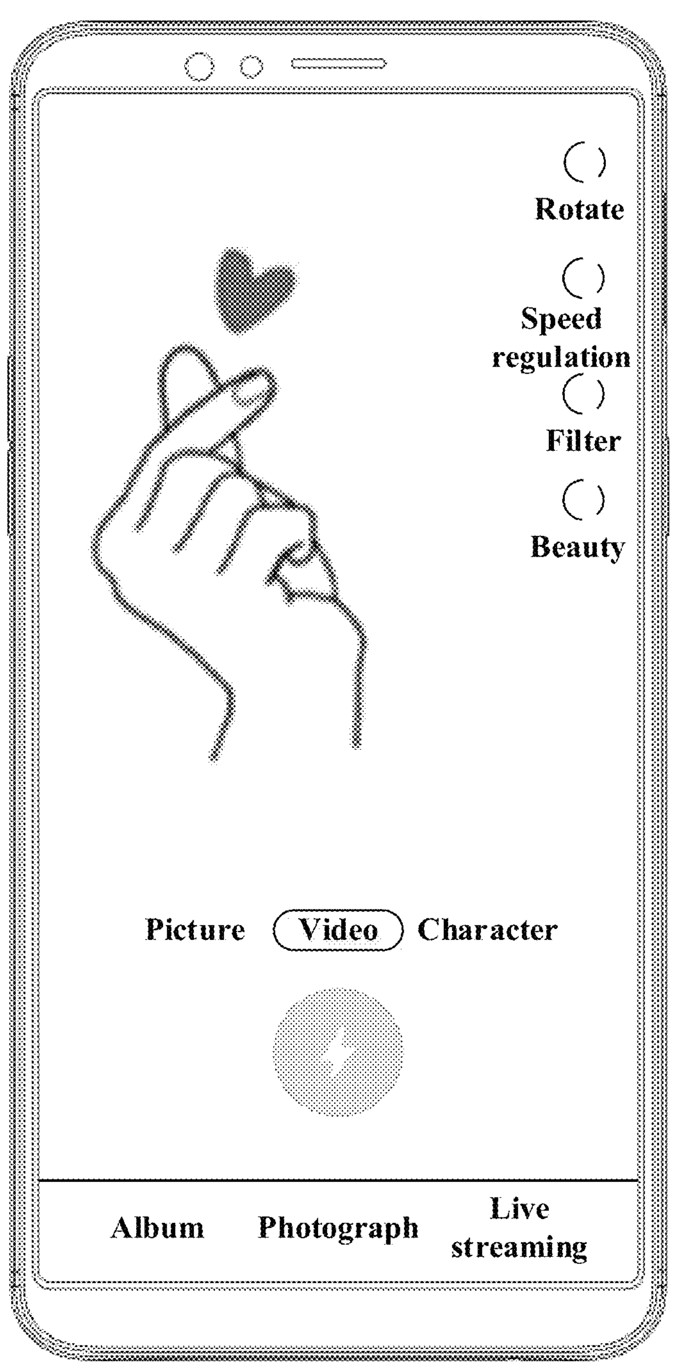
FIG. 4*b* is a schematic diagram of a target image of another pose estimation method provided in an embodiment of the present disclosure.
Figure 4C:
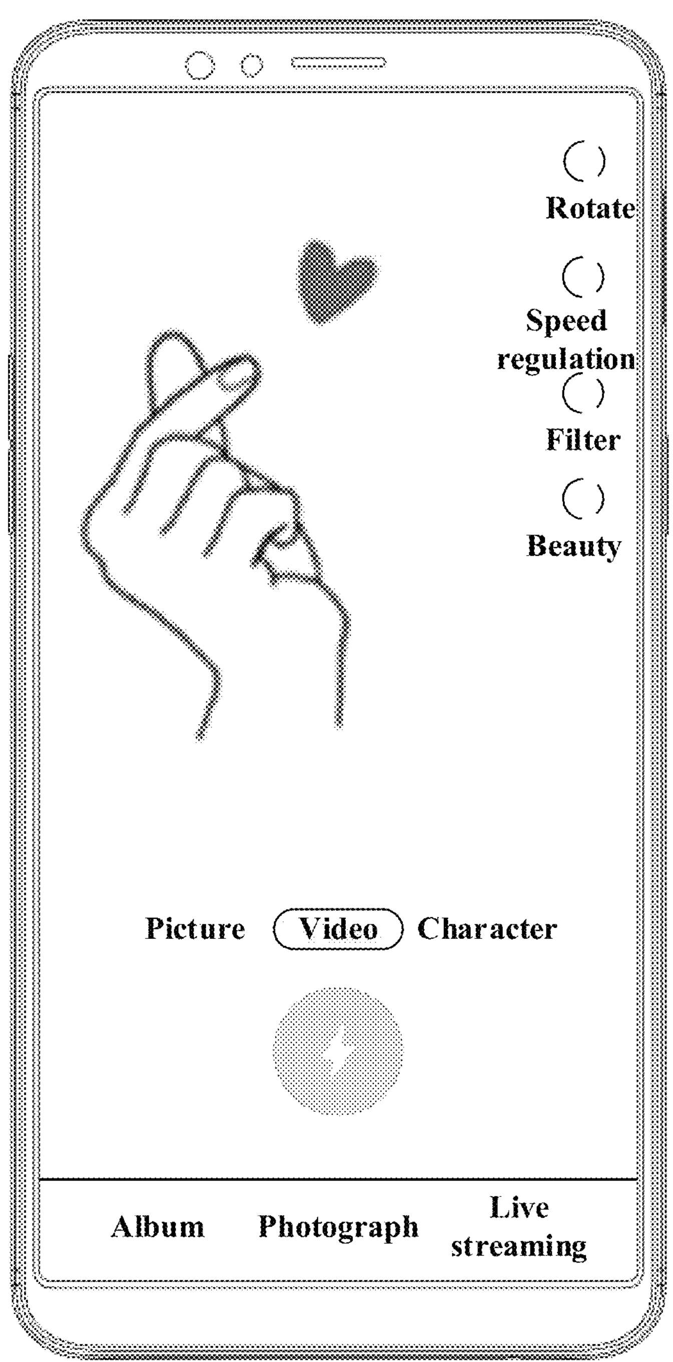
FIG. 4*c* is a schematic diagram of a target image of another pose estimation method provided in an embodiment of the present disclosure.

Based on the above embodiments, in order to more clearly illustrate the application effect of the pose estimation method provided in the present disclosure, a description is specifically given below by means of virtual try-on shown in FIGS. 3*a*, 3*b* and 3*c*, as well as virtual material adding as shown in FIGS. 4*a*, 4*b* and 4*c:*

FIG. 3*a* is a schematic diagram of a previous frame of a target image of a pose estimation method provided in an embodiment of the present disclosure, wherein the target object is a human head, and the application effect is to virtually wear a hat on the human head. As shown in FIG. 3*a*, at this time, the position of the hat is relatively appropriate.

In some embodiments of the present application, multiple frames of continuous reference images before and after a target image are acquired according to timing sequence information; first pose estimations of a target object in the reference images, and a second pose estimation of the target object in the target image are acquired; rotation pose components of the first pose estimations and the second pose estimation are processed by using a rotation smoothing algorithm, so as to generate a target rotation pose component; translation pose components of the first pose estimations and the second pose estimation are processed by using a translation smoothing algorithm, so as to generate a target translation pose component; and a third pose estimation of the target object in the target image is generated according to the target rotation pose component and the target translation pose component.

FIG. 3*b* is a schematic diagram of a target image of a pose estimation method provided in an embodiment of the present disclosure, an application effect added according to the third pose estimation is shown in FIG. 3*b*, the human head is moved clockwise, the hat is correspondingly adjusted, and at this time, the position of the hat is relatively appropriate.

If the effect of the third pose estimation is not good, the application effect may be as shown in FIG. 3*c*, and in FIG. 3*c*, the position of the hat is inappropriate.

FIG. 4*a* is a schematic diagram of a previous frame of a target image of another pose estimation method provided in an embodiment of the present disclosure, wherein the target object is a human hand, and the application effect is to virtually add a loving heart on the human hand. As shown in FIG. 4*a*, at this time, the position of the loving heart is appropriate.

In some embodiments of the present application, multiple frames of continuous reference images before and after the target image are acquired according to timing sequence information; first pose estimations of a target object in the reference images, and a second pose estimation of the target object in the target image are acquired; rotation pose components of the first pose estimations and the second pose estimation are processed by using a rotation smoothing algorithm, so as to generate a target rotation pose component; translation pose components of the first pose estimations and the second pose estimation are processed by using a translation smoothing algorithm, so as to generate a target translation pose component; and a third pose estimation of the target object in the target image is generated according to the target rotation pose component and the target translation pose component.

FIG. 4*b* is a schematic diagram of a target image of another pose estimation method provided in an embodiment of the present disclosure, an application effect added according to the third pose estimation is shown in FIG. 4*b*, the human hand is translated, the loving heart is correspondingly adjusted, and at this time, the position of the loving heart is relatively appropriate.

If the effect of the third pose estimation is not good, the application effect may be as shown in FIG. 4*c*, and in FIG. 4*c*, the following performance of the loving heart for the target object is worse.

According to the pose estimation method provided in the embodiments of the present application, the application scenario includes, but is not limited to, adding a special effect to the target object in the video. By using the present method, the stability and following performance of the application special effect can be improved, and the user experience is thus improved.

Figure 5:
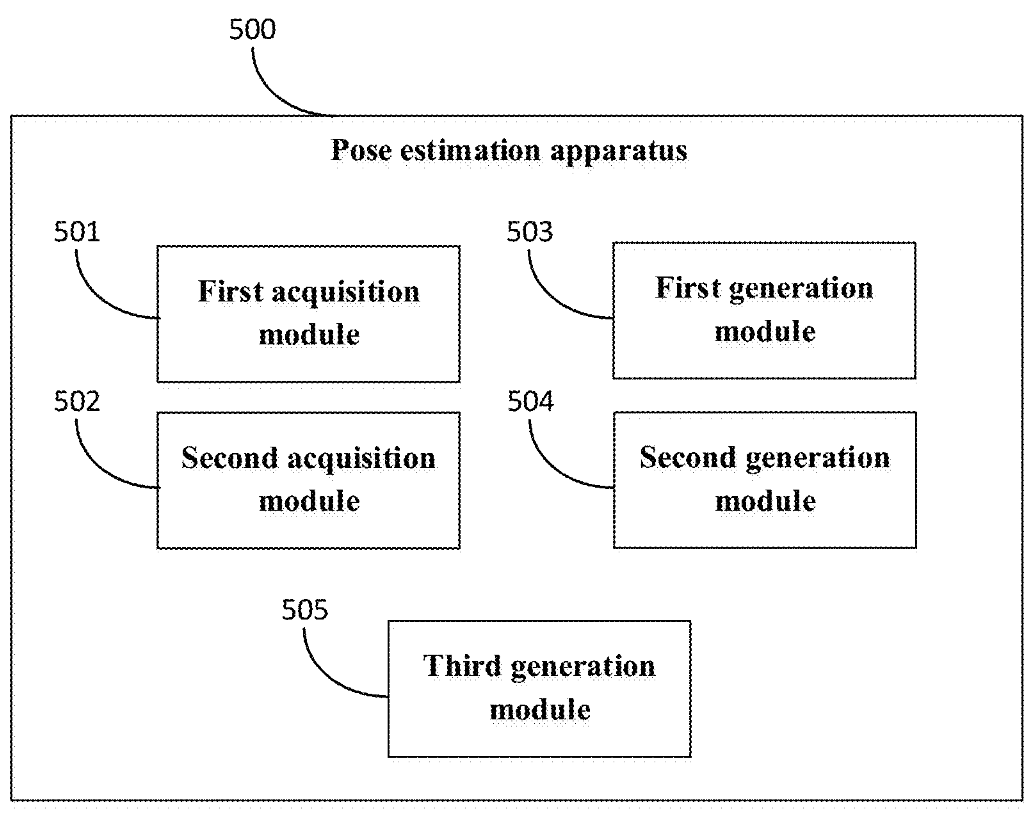
FIG. 5 is a schematic structural diagram of a pose estimation apparatus provided in an embodiment of the present disclosure.

FIG. 5 is a schematic structural diagram of a pose estimation apparatus provided in an embodiment of the present disclosure, and the apparatus may be implemented by software and/or hardware, and may be generally integrated in an electronic device. As shown in FIG. 5, the apparatus includes:

a first acquisition module 501, configured to: according to timing sequence information, acquire multiple frames of continuous reference images before and after a target image in terms of timing sequence;

a second acquisition module 502, configured to acquire a first pose estimation of a target object in each frame of reference image, and a second pose estimation of the target object in the target image;

a first generation module 503, configured to: according to a preset rotation smoothing algorithm, process a rotation pose component of at least one first pose estimation and a rotation pose component of the second pose estimation, so as to generate a target rotation pose component;

a second generation module 504, configured to: according to a preset translation smoothing algorithm, process a translation pose component of each first pose estimation and a translation pose component of the second pose estimation, so as to generate a target translation pose component; and a third generation module 505, configured to generate a third pose estimation of the target object in the target image according to the target rotation pose component and the target translation pose component.

Optionally, the second acquisition module 502 is configured to:

acquire a corresponding first transformation matrix of the target object from a preset initial position to a target position in each frame of reference image, and determine the first transformation matrix as the first pose estimation of the target object in each frame of reference image; and acquire a second transformation matrix of the target object from the initial position to a target position in the target image, and determine the second transformation matrix as the second pose estimation of the target object in the target image.

Optionally, the apparatus further includes:

a first calculation module, configured to calculate the at least one first transformation matrix according to a preset association algorithm, which is represented by a quaternion and a rotation, so as to acquire the rotation pose component of the at least one first transformation matrix, and calculate the second transformation matrix to acquire the rotation pose component of the second transformation matrix; and a second calculation module, configured to respectively extract translations of the target object on a horizontal axis, a vertical axis and a longitudinal axis for each first transformation matrix, so as to acquire the translation pose component of each first transformation matrix, and extract the translations of the target object on the horizontal axis, the vertical axis and the longitudinal axis for the second transformation matrix, so as to acquire the translation pose component of the second transformation matrix.

Optionally, the first generation module 503 is configured to:

acquire the rotation pose component of the first transformation matrix of the target object in the previous frame of reference image of the target image;

acquire the rotation pose component of the second transformation matrix of the target object in the target image; and according to a preset spherical linear interpolation algorithm, process the rotation pose component of the first transformation matrix of the previous frame of reference image, the rotation pose component of the second transformation matrix of the target image, and a preset rotation smoothing coefficient, so as to generate the target rotation pose component.

Optionally, the apparatus further includes:

a third acquisition module, configured to: according to a preset algorithm, calculate the rotation pose component of the first transformation matrix of the previous frame of reference image and the rotation pose component of the second transformation matrix of the target image, so as to acquire a first result;

a fourth acquisition module, configured to take a maximum value between the first result and a preset first coefficient as a second result;

a fourth generation module, configured to process the second result according to the preset algorithm, so as to generate a third result; and a fifth acquisition module, configured to take a minimum value between the third result and a preset second coefficient as the rotation smoothing coefficient.

Optionally, the second generation module 504 is configured to:

acquire the translation pose component of the first transformation matrix of the target object in each frame of reference image;

acquire the translation pose component of the second transformation matrix of the target object in the target image;

based on the translation pose component of the first transformation matrix of each frame of reference image and the translation pose component of the second transformation matrix of the target image, generate a translation vector according to timing sequence information;

according to a least square method, process the translation vector and a preset translation coefficient by using a linear function fitting algorithm, so as to generate a translation motion trajectory; and extract, from the translation motion trajectory, the target translation pose component corresponding to time point information of the target image.

Optionally, the apparatus further includes:

a first determination module, configured to determine the translation coefficient according to the reference image and the number of image frames of the target image.

Optionally, the third generation module 505 is configured to:

perform point multiplication processing on the target rotation pose component and the target translation pose component, so as to generate a third transformation matrix of the target object in the target image, and determine the third transformation matrix as the third pose estimation of the target object in the target image.

The pose estimation apparatus provided in the embodiment of the present disclosure may execute the pose estimation method provided in any embodiment of the present disclosure, and has corresponding functional modules and beneficial effects of executing the method.

An embodiment of the present disclosure further provides a computer program product, including a computer program/instruction, wherein the computer program/instruction, when executed by a processor, implements the pose estimation method provided in any embodiment of the present disclosure.

Figure 6:
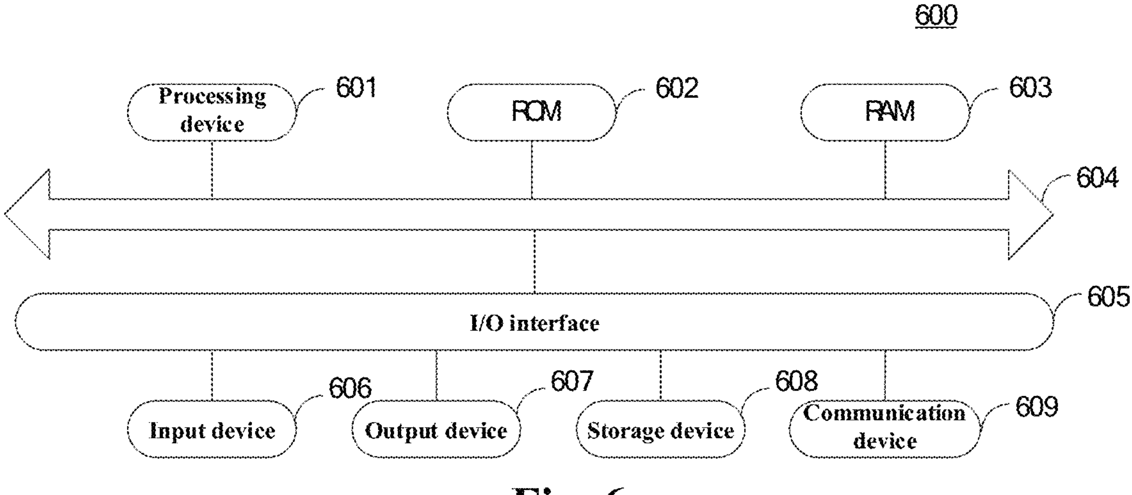
FIG. 6 is a schematic structural diagram of an electronic device provided in an embodiment of the present disclosure.

FIG. 6 is a schematic structural diagram of an electronic device provided in an embodiment of the present disclosure.

Specifically referring to FIG. 6, it illustrates a schematic structural diagram of an electronic device 600 suitable for implementing the embodiments of the present disclosure. The electronic device 600 in the embodiment of the present disclosure may include, but is not limited to, mobile terminals such as mobile phones, notebook computers, digital broadcast receivers, PDAs (Personal Digital Assistants), PADs (Portable Android Devices), PMPs (Portable Media Players), vehicle-mounted terminals (e.g., vehicle-mounted navigation terminals), wearable electronic devices, and the like, and fixed terminals such as digital TVs, desktop computers, smart home devices, and the like. The electronic device shown in FIG. 6 is merely an example, and should not bring any limitation to the functions and use ranges of the embodiments of the present disclosure.

As shown in FIG. 6, the electronic device 600 may include a processing apparatus (e.g., a central processing unit, a graphics processing unit, or the like) 601, which may perform various suitable actions and processes in accordance with a program stored in a read only memory (ROM) 602 or a program loaded from a storage apparatus 608 into a random access memory (RAM) 603. In the RAM 603, various programs and data needed by the operations of the electronic device 600 are also stored. The processing apparatus 601, the ROM 602 and the RAM 603 are connected to each other via a bus 604. An input/output (I/O) interface 605 is also connected to the bus 604.

In general, the following apparatuses may be connected to the I/O interface 605: an input apparatus 606, including, for example, a touch screen, a touch pad, a keyboard, a mouse, a camera, a microphone, an accelerometer, a gyroscope, and the like; an output apparatus 607, including, for example, a liquid crystal display (LCD), a speaker, a vibrator, and the like; a storage apparatus 608, including, for example, a magnetic tape, a hard disk, and the like; and a communication apparatus 609. The communication apparatus 609 may allow the electronic device 600 to communicate in a wireless or wired manner with other devices to exchange data. While FIG. 6 illustrates the electronic device 600 having various apparatuses, it is to be understood that not all illustrated apparatuses are required to be implemented or provided. More or fewer apparatuses may alternatively be implemented or provided.

In particular, according to the embodiments of the present disclosure, the processes described above with reference to the flowcharts may be implemented as computer software programs. For example, the embodiments of the present disclosure include a computer program product, which includes a computer program carried on a non-transitory computer-readable medium, and the computer program contains program codes for performing the method illustrated in the flowcharts. In such embodiments, the computer program may be downloaded and installed from a network via the communication apparatus 609, or installed from the storage apparatus 608, or installed from the ROM 602. When the computer program is executed by the processing apparatus 601, the above functions defined in the pose estimation method of the embodiments of the present disclosure are performed.

It should be noted that, the computer-readable medium described above in the present disclosure may be either a computer-readable signal medium or a computer-readable storage medium, or any combination of the two. The computer-readable storage medium may be, for example, but is not limited to, an electronic, magnetic, optical, electromagnetic, infrared, or semiconductor system, apparatus or device, or a combination of any of the above. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk-read-only memory (CD-ROM), an optical storage device, a magnetic storage device, or any suitable combination of the above. In the present disclosure, the computer-readable storage medium may be any tangible medium that contains or stores a program, wherein the program may be used by or in conjunction with an instruction execution system, apparatus or device. In the present disclosure, the computer-readable signal medium may include a data signal that is included in a baseband or is propagated as part of a carrier, wherein the data signal carries computer-readable program codes. Such propagated data signal may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in conjunction with the instruction execution system, apparatus or device. Program codes contained on the computer-readable medium may be transmitted with any suitable medium, including, but not limited to: an electrical wire, an optical cable, RF (radio frequency), and the like, or any suitable combination thereof.

In some implementations, a client and a server may communicate using any currently known or future-developed network protocol, such as an HTTP (HyperText Transfer Protocol), and may be interconnected with any form or medium of digital data communication (e.g., a communication network). Examples of the communication network comprise local area networks ("LANs"), wide area networks ("WANs"), international networks (e.g., the Internet), and peer-to-peer networks (e.g., ad hoc peer-to-peer networks), as well as any currently known or future-developed networks.

The computer-readable medium may be contained in the above electronic device; and it may also be present separately and is not assembled into the electronic device.

The computer-readable medium carries one or more programs that, when executed by the electronic device, cause the electronic device to execute the following operations: according to timing sequence information, acquiring multiple frames of continuous reference images before and after a target image in terms of timing sequence; acquiring a first pose estimation of a target object in each frame of reference image, and a second pose estimation of the target object in the target image; according to a preset rotation smoothing algorithm, processing a rotation pose component of at least one first pose estimation and a rotation pose component of the second pose estimation, so as to generate a target rotation pose component; according to a preset translation smoothing algorithm, processing a translation pose component of each first pose estimation and a translation pose component of the second pose estimation, so as to generate a target translation pose component; and generating a third pose estimation of the target object in the target image according to the target rotation pose component and the target translation pose component. The third pose estimation generated in the embodiments of the present disclosure has good stability and following performance, the generation of a floating feeling is avoided, and the user experience and satisfaction are thus improved.

Computer program codes for executing the operations of the present disclosure may be written in one or more programming languages or combinations thereof. The programming languages include object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or a server. In the case involving the remote computer, the remote computer may be connected to the user computer through any type of network, including a local area network (LAN) or a wide area network (WAN), or it may be connected to an external computer (e.g., through the Internet using an Internet service provider).

The flowcharts and block diagrams in the drawings illustrate the system architecture, functions and operations of possible implementations of systems, methods and computer program products according to various embodiments of the present disclosure. In this regard, each block in the flowcharts or block diagrams may represent a part of a module, a program segment, or a code, which contains one or more executable instructions for implementing specified logical functions. It should also be noted that, in some alternative implementations, the functions noted in the block may occur out of the order noted in the drawings. For example, two blocks shown in succession may, in fact, be executed substantially concurrently, or the blocks may sometimes be executed in a reverse order, depending upon the functions involved. It should also be noted that each block in the block diagrams and/or flowcharts, and combinations of the blocks in the block diagrams and/or flowcharts may be implemented by dedicated hardware-based systems for performing specified functions or operations, or combinations of dedicated hardware and computer instructions.

The units involved in the described embodiments of the present disclosure may be implemented in a software or hardware manner. The names of the units do not constitute limitations of the units themselves in a certain case.

The functions described herein above may be performed, at least in part, by one or more hardware logic components. For example, without limitation, example types of the hardware logic components that may be used include: field programmable gate arrays (FPGAs), application-specific integrated circuits (ASICs), application-specific standard products (ASSPs), system on chips (SOCs), complex programmable logic devices (CPLDs), and so on.

In the context of the present disclosure, a machine-readable medium may be a tangible medium, which may contain or store a program for use by or in conjunction with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, a random access memory (RAM), a read-only memory (ROM), an erasable programmable read-only memory (EPROM or a flash memory), an optical fiber, a compact disc-read-only memory (CD-ROM), an optical storage device, a magnetic storage device, or any suitable combination thereof.

According to one or more embodiments of the present disclosure, the present disclosure provides a pose estimation method, including:

according to timing sequence information, acquiring multiple frames of continuous reference images before and after a target image in terms of timing sequence;

acquiring a first pose estimation of a target object in each frame of reference image, and a second pose estimation of the target object in the target image;

according to a preset rotation smoothing algorithm, processing a rotation pose component of at least one first pose estimation and a rotation pose component of the second pose estimation, so as to generate a target rotation pose component;

according to a preset translation smoothing algorithm, processing a translation pose component of each first pose estimation and a translation pose component of the second pose estimation, so as to generate a target translation pose component; and generating a third pose estimation of the target object in the target image according to the target rotation pose component and the target translation pose component.

According to one or more embodiments of the present disclosure, in the pose estimation method provided in the present disclosure, acquiring the first pose estimation of the target object in each frame of reference image, and the second pose estimation of the target object in the target image, includes:

acquiring a corresponding first transformation matrix of the target object from a preset initial position to a target position in each frame of reference image, and determining the first transformation matrix as the first pose estimation of the target object in each frame of reference image; and acquiring a second transformation matrix of the target object from the initial position to a target position in the target image, and determining the second transformation matrix as the second pose estimation of the target object in the target image.

According to one or more embodiments of the present disclosure, the pose estimation method provided in the present disclosure further includes:

calculating the at least one first transformation matrix according to a preset association algorithm, which is represented by a quaternion and a rotation, so as to acquire the rotation pose component of the at least one first transformation matrix, and calculating the second transformation matrix to acquire the rotation pose component of the second transformation matrix; and respectively extracting translations of the target object on a horizontal axis, a vertical axis and a longitudinal axis for each first transformation matrix, so as to acquire the translation pose component of each first transformation matrix, and extracting the translations of the target object on the horizontal axis, the vertical axis and the longitudinal axis for the second transformation matrix, so as to acquire the translation pose component of the second transformation matrix.

According to one or more embodiments of the present disclosure, in the pose estimation method provided in the present disclosure, according to the preset rotation smoothing algorithm, processing the rotation pose component of the at least one first pose estimation and the rotation pose component of the second pose estimation, so as to generate the target rotation pose component, includes:

acquiring the rotation pose component of the first transformation matrix of the target object in the previous frame of reference image of the target image;

acquiring the rotation pose component of the second transformation matrix of the target object in the target image; and according to a preset spherical linear interpolation algorithm, processing the rotation pose component of the first transformation matrix of the previous frame of reference image, the rotation pose component of the second transformation matrix of the target image, and a preset rotation smoothing coefficient, so as to generate the target rotation pose component.

According to one or more embodiments of the present disclosure, the pose estimation method provided in the present disclosure further includes:

according to a preset algorithm, calculating the rotation pose component of the first transformation matrix of the previous frame of reference image and the rotation pose component of the second transformation matrix of the target image, so as to acquire a first result;

taking a maximum value between the first result and a preset first coefficient as a second result;

processing the second result according to the preset algorithm, so as to generate a third result; and taking a minimum value between the third result and a preset second coefficient as the rotation smoothing coefficient.

According to one or more embodiments of the present disclosure, in the pose estimation method provided in the present disclosure, according to the preset translation smoothing algorithm, processing the translation pose component of each first pose estimation and the translation pose component of the second pose estimation, so as to generate the target translation pose component, includes:

acquiring the translation pose component of the first transformation matrix of the target object in each frame of reference image;

acquiring the translation pose component of the second transformation matrix of the target object in the target image;

based on the translation pose component of the first transformation matrix of each frame of reference image and the translation pose component of the second transformation matrix of the target image, generating a translation vector according to timing sequence information;

according to a least square method, processing the translation vector and a preset translation coefficient by using a linear function fitting algorithm, so as to generate a translation motion trajectory; and extracting, from the translation motion trajectory, the target translation pose component corresponding to time point information of the target image.

According to one or more embodiments of the present disclosure, the pose estimation method provided in the present disclosure further includes:

determining the translation coefficient according to the reference image and the number of image frames of the target image.

According to one or more embodiments of the present disclosure, in the pose estimation method provided in the present disclosure, step: generating the third pose estimation of the target object in the target image according to the target rotation pose component and the target translation pose component, includes:

performing point multiplication processing on the target rotation pose component and the target translation pose component, so as to generate a third transformation matrix of the target object in the target image, and determining the third transformation matrix as the third pose estimation of the target object in the target image.

According to one or more embodiments of the present disclosure, the present disclosure provides a pose estimation apparatus, including:

a first acquisition module, configured to: according to timing sequence information, acquire multiple frames of continuous reference images before and after a target image in terms of timing sequence;

a second acquisition module, configured to acquire a first pose estimation of a target object in each frame of reference image, and a second pose estimation of the target object in the target image;

a first generation module, configured to: according to a preset rotation smoothing algorithm, process a rotation pose component of at least one first pose estimation and a rotation pose component of the second pose estimation, so as to generate a target rotation pose component;

a second generation module, configured to: according to a preset translation smoothing algorithm, process a translation pose component of each first pose estimation and a translation pose component of the second pose estimation, so as to generate a target translation pose component; and a third generation module, configured to generate a third pose estimation of the target object in the target image according to the target rotation pose component and the target translation pose component.

According to one or more embodiments of the present disclosure, in the pose estimation apparatus provided in the present disclosure, the second acquisition module is configured to:

acquire a corresponding first transformation matrix of the target object from a preset initial position to a target position in each frame of reference image, and determine the first transformation matrix as the first pose estimation of the target object in each frame of reference image; and acquire a second transformation matrix of the target object from the initial position to a target position in the target image, and determine the second transformation matrix as the second pose estimation of the target object in the target image.

According to one or more embodiments of the present disclosure, in the pose estimation apparatus provided in the present disclosure, the apparatus further includes:

a first calculation module, configured to calculate the at least one first transformation matrix according to a preset association algorithm, which is represented by a quaternion and a rotation, so as to acquire the rotation pose component of the at least one first transformation matrix, and calculate the second transformation matrix to acquire the rotation pose component of the second transformation matrix; and a second calculation module, configured to respectively extract translations of the target object on a horizontal axis, a vertical axis and a longitudinal axis for each first transformation matrix, so as to acquire the translation pose component of each first transformation matrix, and extract the translations of the target object on the horizontal axis, the vertical axis and the longitudinal axis for the second transformation matrix, so as to acquire the translation pose component of the second transformation matrix.

According to one or more embodiments of the present disclosure, in the pose estimation apparatus provided in the present disclosure, the first generation module is configured to:

acquire the rotation pose component of the first transformation matrix of the target object in the previous frame of reference image of the target image;

acquire the rotation pose component of the second transformation matrix of the target object in the target image; and according to a preset spherical linear interpolation algorithm, process the rotation pose component of the first transformation matrix of the previous frame of reference image, the rotation pose component of the second transformation matrix of the target image, and a preset rotation smoothing coefficient, so as to generate the target rotation pose component.

According to one or more embodiments of the present disclosure, in the pose estimation apparatus provided in the present disclosure, the apparatus further includes:

a third acquisition module, configured to: according to a preset algorithm, calculate the rotation pose component of the first transformation matrix of the previous frame of reference image and the rotation pose component of the second transformation matrix of the target image, so as to acquire a first result;

a fourth acquisition module, configured to take a maximum value between the first result and a preset first coefficient as a second result;

a fourth generation module, configured to process the second result according to the preset algorithm, so as to generate a third result; and a fifth acquisition module, configured to take a minimum value between the third result and a preset second coefficient as the rotation smoothing coefficient.

According to one or more embodiments of the present disclosure, in the pose estimation apparatus provided in the present disclosure, the second generation module is configured to:

acquire the translation pose component of the first transformation matrix of the target object in each frame of reference image;

acquire the translation pose component of the second transformation matrix of the target object in the target image;

based on the translation pose component of the first transformation matrix of each frame of reference image and the translation pose component of the second transformation matrix of the target image, generate a translation vector according to timing sequence information;

according to a least square method, process the translation vector and a preset translation coefficient by using a linear function fitting algorithm, so as to generate a translation motion trajectory; and extract, from the translation motion trajectory, the target translation pose component corresponding to time point information of the target image.

According to one or more embodiments of the present disclosure, in the pose estimation apparatus provided in the present disclosure, the apparatus further includes:

a first determination module, configured to determine the translation coefficient according to the reference image and the number of image frames of the target image.

According to one or more embodiments of the present disclosure, in the pose estimation apparatus provided in the present disclosure, the third generation module is configured to:

perform point multiplication processing on the target rotation pose component and the target translation pose component, so as to generate a third transformation matrix of the target object in the target image, and determine the third transformation matrix as the third pose estimation of the target object in the target image.

According to one or more embodiments of the present disclosure, the present disclosure provides an electronic device, including:

a processor; and a memory used for storing a processor-executable instruction;

the processor is used for reading the executable instruction from the memory and executing the instruction to implement any pose estimation method provided in the present disclosure.

According to one or more embodiments of the present disclosure, the present disclosure provides a computer-readable storage medium, wherein a computer program is stored in the storage medium, and the computer program is used for executing any pose estimation method provided in the present disclosure.

What have been described above are only preferred embodiments of the present disclosure and illustrations of the technical principles employed. It will be appreciated by those skilled in the art that the disclosure scope involved herein is not limited to the technical solutions formed by specific combinations of the above technical features, and meanwhile should also include other technical solutions formed by any combinations of the above technical features or equivalent features thereof, for example, technical solutions formed by mutual replacement of the above features with technical features having similar functions disclosed in the present disclosure (but is not limited to).

In addition, although various operations are depicted in a particular order, this should not be understood as requiring that these operations are performed in the particular order shown or in a sequential order. In certain circumstances, multitasking and parallel processing may be advantageous. Similarly, although several specific implementation details have been contained in the above discussion, these should not be construed as limiting the scope of the present disclosure. Certain features that are described in the context of separate embodiments may also be implemented in combination in a single embodiment. Conversely, various features that are described in the context of a single embodiment may also be implemented in a plurality of embodiments separately or in any suitable sub-combination.

Although the present theme has been described in language specific to structural features and/or methodological actions, it is to be understood that the theme defined in the appended claims is not necessarily limited to the specific features or actions described above. Rather, the specific features and actions described above are merely example forms of implementing the claims.

We claim:

1. A pose estimation method, comprising:

according to timing sequence information, acquiring multiple frames of continuous reference images before and after a target image in terms of timing sequence acquiring a first pose estimation of a target object in each frame of reference image, and a second pose estimation of the target object in the target image;

according to a preset rotation smoothing algorithm, processing a rotation pose component of at least one first pose estimation and a rotation pose component of the second pose estimation, to generate a target rotation pose component;

according to a preset translation smoothing algorithm, processing a translation pose component of each first pose estimation and a translation pose component of the second pose estimation, to generate a target translation pose component; and generating a third pose estimation of the target object in the target image according to the target rotation pose component and the target translation pose component, comprising performing point multiplication processing on the target rotation pose component and the target translation pose component, to generate a transformation matrix of the target object in the target image, and determining the transformation matrix as the third pose estimation of the target object in the target image.

2. The method according to claim 1, wherein acquiring the first pose estimation of the target object in each frame of reference image, and the second pose estimation of the target object in the target image, comprises:

acquiring a corresponding first transformation matrix of the target object from a preset initial position to a target position in each frame of reference image, and determining the first transformation matrix as the first pose estimation of the target object in each frame of reference image; and acquiring a second transformation matrix of the target object from the initial position to a target position in the target image, and determining the second transformation matrix as the second pose estimation of the target object in the target image.

3. The method according to claim 2, further comprising:

calculating the at least one first transformation matrix according to a preset association algorithm, which is represented by a quaternion and a rotation, to acquire the rotation pose component of the at least one first transformation matrix, and calculating the second transformation matrix to acquire the rotation pose component of the second transformation matrix; and respectively extracting translations of the target object on a horizontal axis, a vertical axis and a longitudinal axis for each first transformation matrix, to acquire the translation pose component of each first transformation matrix, and extracting the translations of the target object on the horizontal axis, the vertical axis and the longitudinal axis for the second transformation matrix, to acquire the translation pose component of the second transformation matrix.

4. The method according to claim 2, wherein according to the preset rotation smoothing algorithm, processing the rotation pose component of the at least one first pose estimation and the rotation pose component of the second pose estimation, to generate the target rotation pose component, comprises:

acquiring the rotation pose component of the first transformation matrix of the target object in the previous frame of reference image of the target image;

acquiring the rotation pose component of the second transformation matrix of the target object in the target image; and according to a preset spherical linear interpolation algorithm, processing the rotation pose component of the first transformation matrix of the previous frame of reference image, the rotation pose component of the second transformation matrix of the target image, and a preset rotation smoothing coefficient, to generate the target rotation pose component.

5. The method according to claim 4, further comprising:

according to a preset algorithm, calculating the rotation pose component of the first transformation matrix of the previous frame of reference image and the rotation pose component of the second transformation matrix of the target image, to acquire a first result;

taking a maximum value between the first result and a preset first coefficient as a second result;

processing the second result according to the preset algorithm, to generate a third result; and taking a minimum value between the third result and a preset second coefficient as the rotation smoothing coefficient.

6. The method according to claim 2, wherein according to the preset translation smoothing algorithm, processing the translation pose component of each first pose estimation and the translation pose component of the second pose estimation, to generate the target translation pose component, comprises:

acquiring the translation pose component of the first transformation matrix of the target object in each frame of reference image;

acquiring the translation pose component of the second transformation matrix of the target object in the target image;

based on the translation pose component of the first transformation matrix of each frame of reference image and the translation pose component of the second transformation matrix of the target image, generating a translation vector according to timing sequence information;

according to a least square method, processing the translation vector and a preset translation coefficient by using a linear function fitting algorithm, to generate a translation motion trajectory; and extracting, from the translation motion trajectory, the target translation pose component corresponding to time point information of the target image.

7. The method according to claim 6, further comprising:

determining the translation coefficient according to the reference image and the number of image frames of the target image.

8. An electronic device, wherein the electronic device comprises:

a processor; and a memory used for storing a processor-executable instruction;

the processor is used for reading the executable instruction from the memory and executing the instruction to cause the electronic device to perform acts comprising:

according to timing sequence information, acquiring multiple frames of continuous reference images before and after a target image in terms of timing sequence;

acquiring a first pose estimation of a target object in each frame of reference image, and a second pose estimation of the target object in the target image;

according to a preset rotation smoothing algorithm, processing a rotation pose component of at least one first pose estimation and a rotation pose component of the second pose estimation, to generate a target rotation pose component;

according to a preset translation smoothing algorithm, processing a translation pose component of each first pose estimation and a translation pose component of the second pose estimation, to generate a target translation pose component; and generating a third pose estimation of the target object in the target image according to the target rotation pose component and the target translation pose component, comprising performing point multiplication processing on the target rotation pose component and the target translation pose component, to generate a transformation matrix of the target object in the target image, and determining the transformation matrix as the third pose estimation of the target object in the target image.

9. A non-transitory computer-readable storage medium, wherein an instruction is stored in the computer-readable storage medium, and when the instruction is running on a terminal device, the terminal device performs acts comprising:

according to timing sequence information, acquiring multiple frames of continuous reference images before and after a target image in terms of timing sequence;

acquiring a first pose estimation of a target object in each frame of reference image, and a second pose estimation of the target object in the target image;

according to a preset rotation smoothing algorithm, processing a rotation pose component of at least one first pose estimation and a rotation pose component of the second pose estimation, to generate a target rotation pose component;

according to a preset translation smoothing algorithm, processing a translation pose component of each first pose estimation and a translation pose component of the second pose estimation, to generate a target translation pose component; and generating a third pose estimation of the target object in the target image according to the target rotation pose component and the target translation pose component, comprising performing point multiplication processing on the target rotation pose component and the target translation pose component, to generate a transformation matrix of the target object in the target image, and determining the transformation matrix as the third pose estimation of the target object in the target image.

10. The electronic device according to claim 8, wherein acquiring the first pose estimation of the target object in each frame of reference image, and the second pose estimation of the target object in the target image, comprises:

acquiring a corresponding first transformation matrix of the target object from a preset initial position to a target position in each frame of reference image, and determining the first transformation matrix as the first pose estimation of the target object in each frame of reference image; and acquiring a second transformation matrix of the target object from the initial position to a target position in the target image, and determining the second transformation matrix as the second pose estimation of the target object in the target image.

11. The electronic device according to claim 10, the acts further comprising:

calculating the at least one first transformation matrix according to a preset association algorithm, which is represented by a quaternion and a rotation, to acquire the rotation pose component of the at least one first transformation matrix, and calculating the second transformation matrix to acquire the rotation pose component of the second transformation matrix; and respectively extracting translations of the target object on a horizontal axis, a vertical axis and a longitudinal axis for each first transformation matrix, to acquire the translation pose component of each first transformation matrix, and extracting the translations of the target object on the horizontal axis, the vertical axis and the longitudinal axis for the second transformation matrix, to acquire the translation pose component of the second transformation matrix.

12. The electronic device according to claim 10, wherein according to the preset rotation smoothing algorithm, processing the rotation pose component of the at least one first pose estimation and the rotation pose component of the second pose estimation, to generate the target rotation pose component, comprises:

acquiring the rotation pose component of the first transformation matrix of the target object in the previous frame of reference image of the target image;

acquiring the rotation pose component of the second transformation matrix of the target object in the target image; and according to a preset spherical linear interpolation algorithm, processing the rotation pose component of the first transformation matrix of the previous frame of reference image, the rotation pose component of the second transformation matrix of the target image, and a preset rotation smoothing coefficient, to generate the target rotation pose component.

13. The electronic device according to claim 12, the acts further comprising:

according to a preset algorithm, calculating the rotation pose component of the first transformation matrix of the previous frame of reference image and the rotation pose component of the second transformation matrix of the target image, to acquire a first result;

taking a maximum value between the first result and a preset first coefficient as a second result;

processing the second result according to the preset algorithm, to generate a third result; and taking a minimum value between the third result and a preset second coefficient as the rotation smoothing coefficient.

14. The electronic device according to claim 10, wherein according to the preset translation smoothing algorithm, processing the translation pose component of each first pose estimation and the translation pose component of the second pose estimation, to generate the target translation pose component, comprises:

acquiring the translation pose component of the first transformation matrix of the target object in each frame of reference image;

acquiring the translation pose component of the second transformation matrix of the target object in the target image;

based on the translation pose component of the first transformation matrix of each frame of reference image and the translation pose component of the second transformation matrix of the target image, generating a translation vector according to timing sequence information;

according to a least square method, processing the translation vector and a preset translation coefficient by using a linear function fitting algorithm, to generate a translation motion trajectory; and extracting, from the translation motion trajectory, the target translation pose component corresponding to time point information of the target image.

15. The electronic device according to claim 14, the acts further comprising:

determining the translation coefficient according to the reference image and the number of image frames of the target image.

16. The non-transitory computer-readable storage medium according to claim 9, wherein acquiring the first pose estimation of the target object in each frame of reference image, and the second pose estimation of the target object in the target image, comprises:

acquiring a corresponding first transformation matrix of the target object from a preset initial position to a target position in each frame of reference image, and determining the first transformation matrix as the first pose estimation of the target object in each frame of reference image; and acquiring a second transformation matrix of the target object from the initial position to a target position in the target image, and determining the second transformation matrix as the second pose estimation of the target object in the target image.

17. The non-transitory computer-readable storage medium according to claim 16, the acts further comprising:

calculating the at least one first transformation matrix according to a preset association algorithm, which is represented by a quaternion and a rotation, to acquire the rotation pose component of the at least one first transformation matrix, and calculating the second transformation matrix to acquire the rotation pose component of the second transformation matrix; and respectively extracting translations of the target object on a horizontal axis, a vertical axis and a longitudinal axis for each first transformation matrix, to acquire the translation pose component of each first transformation matrix, and extracting the translations of the target object on the horizontal axis, the vertical axis and the longitudinal axis for the second transformation matrix, to acquire the translation pose component of the second transformation matrix.

18. The non-transitory computer-readable storage medium according to claim 16, wherein according to the preset rotation smoothing algorithm, processing the rotation pose component of the at least one first pose estimation and the rotation pose component of the second pose estimation, to generate the target rotation pose component, comprises:

acquiring the rotation pose component of the first transformation matrix of the target object in the previous frame of reference image of the target image;

acquiring the rotation pose component of the second transformation matrix of the target object in the target image; and according to a preset spherical linear interpolation algorithm, processing the rotation pose component of the first transformation matrix of the previous frame of reference image, the rotation pose component of the second transformation matrix of the target image, and a preset rotation smoothing coefficient, to generate the target rotation pose component.

* * * * *